United States Patent
Gurfinkel Castillo et al.

(10) Patent No.: US 6,677,387 B2
(45) Date of Patent: Jan. 13, 2004

(54) PREPARATION OF STABLE EMULSION USING DYNAMIC OR STATIC MIXERS

(75) Inventors: Mariano E Gurfinkel Castillo, Caracas (VE); Franzo Agustin Marruffo Rodriguez, Caracas (VE); Manuel Segundo Chirinos, Los Teques (VE); Felix Abraham Silva, San Antonio de los Altos (VE); Gustavo Padron, Silver Springs, MD (US); Gustavo A Núñez, El Hatillo (VE); Clara E. Mata, Edo. Miranda (VE); Carolina Blanco, La Lagunita (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 10/162,042

(22) Filed: Jun. 3, 2002

(65) Prior Publication Data

US 2003/0225166 A1 Dec. 4, 2003

(51) Int. Cl.⁷ .................................................. B01F 3/08
(52) U.S. Cl. ............................ 516/53; 516/76; 516/924; 44/301; 366/336; 366/175.2
(58) Field of Search ............................ 516/53, 76, 924; 44/301; 366/336, 175.2

(56) References Cited

U.S. PATENT DOCUMENTS

| | | | |
|---|---|---|---|
| 4,832,747 A | * | 5/1989 | Marchal ...................... 516/928 |
| 5,000,872 A | * | 3/1991 | Olah ............................ 516/76 |
| 5,236,624 A | * | 8/1993 | Lepert et al. ................ 516/928 |
| 5,480,583 A | * | 1/1996 | Rivas et al. ................... 44/301 |
| 5,503,772 A | * | 4/1996 | Rivas et al. ................... 516/53 |
| 5,505,876 A | * | 4/1996 | Rivas et al. ................... 516/76 |
| 5,622,920 A | * | 4/1997 | Rivas et al. ................... 44/301 |

* cited by examiner

Primary Examiner—Daniel S. Metzmaier
(74) Attorney, Agent, or Firm—Bachman & LaPointe, P.C.

(57) ABSTRACT

A process for preparing a hydrocarbon in water emulsion, comprising the steps of providing a liquid additive that tends to gel when mixed with water at temperatures less than a gelling temperature $T_G$; providing a stream of water at a temperature $T_C$ less than the gelling temperature $T_G$; feeding said stream to a mixer having a mixer inlet so as to impart energy to the stream; adding the liquid additive to the stream downstream of the mixer inlet, whereby the liquid additive mixes with the stream and the energy inhibits gelling of the liquid additive so as to provide a substantially homogeneous solution of the liquid additive in the water; and mixing the solution with a hydrocarbon in a mixer so as to form a hydrocarbon-in-water emulsion. In further accordance with the invention, different emulsions can be formed and combined so as to provide a combined emulsion having desired properties.

14 Claims, 7 Drawing Sheets

PREPARATION OF STABLE EMULSION USING DYNAMIC OR STATIC MIXERS

BACKGROUND OF THE INVENTION

The invention relates to the preparation of emulsions and, more particularly, to a process for preparing such emulsions and mixtures of emulsions wherein gelling of additives such as surfactants is avoided and wherein properties of the emulsion can be tailored to desired requirements.

Viscous hydrocarbons such as natural bitumen are found in significant amounts in Canada, the United States, China, Nigeria and Venezuela. These hydrocarbons typically are liquid having viscosities from 1,000 to 600,000 cP at room temperature. This viscosity, and the relative low reactivity of such materials, make for substantial difficulties in handling. One method for addressing such problems is to make an emulsion in water of such materials thereby reducing viscosity of same and consequently improving properties of the product as a fuel.

Different methods have been proposed for preparing such emulsions, and these emulsions must be stabilized using emulsifiers or surfactants which can be added and/or activated from within the hydrocarbon. Additionally, the emulsion should remain stable upon inclusion of other substances or additives as desired.

It is the primary object of the present invention to provide a process for preparing an emulsion of viscous hydrocarbon in water which produces a stable and useful end product.

Other objects and advantages of the present invention will appear hereinbelow.

SUMMARY OF THE INVENTION

In accordance with the present invention, the foregoing objects and advantages have been readily attained.

According to the invention, a process is provided for preparing a hydrocarbon in water emulsion, which process comprises the steps of providing a liquid additive that tends to gel when mixed with water at temperatures less than a gelling temperature $T_G$; providing a stream of water at a temperature $T_C$ less than said gelling temperature $T_G$; feeding said stream to a mixer having a mixer inlet so as to impart energy to said stream; adding said liquid additive to said stream downstream of said mixer inlet, whereby said liquid additive mixes with said stream and said energy inhibits gelling of said liquid additives so as to provide a substantially homogeneous solution of said liquid additive in water; and mixing said solution with hydrocarbon in a mixer so as to form a hydrocarbon-in-water emulsion.

The water solution preparation step in accordance with the present invention advantageously avoids the formation of gel without excessive use of heating and cooling.

According to a further embodiment of the invention, a process is also provided which allows for fine tuning the emulsion to have desirable properties.

BRIEF DESCRIPTION OF THE DRAWINGS

A detailed description of preferred embodiments of the present invention follows, with reference to the attached drawings, wherein.

DETAILED DESCRIPTION

The invention relates to a process for preparing hydrocarbon-in-water emulsions using a process for preparing solutions of additives and surfactants wherein heating and a static mixer are used to avoid gel formation of the additives.

The invention further relates to a process for preparing hydrocarbon-in-water emulsions using a process for preparing concentrated emulsions, and diluting and/or mixing them with other emulsions so as to create emulsions with specific geometric and rheological properties.

Figure 1:
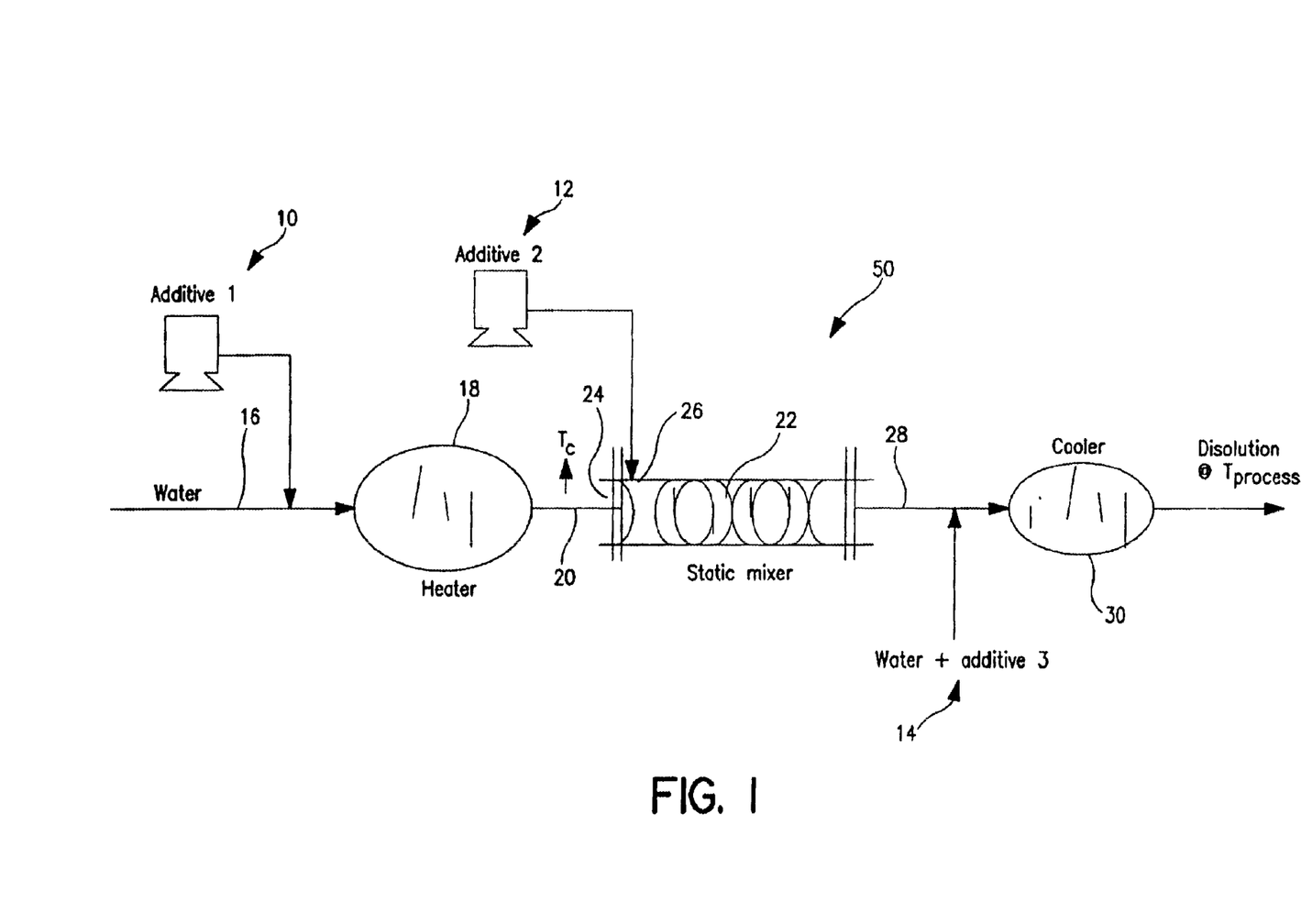
FIG. 1 schematically illustrates a process in accordance with the present invention.

FIG. 1 schematically illustrates a surfactant solution preparation process wherein several additives 10, 12, 14 are to be added to a stream 16 of water. In accordance with this embodiment of the present invention, additives 10 and 14 are water soluble, and do not gel, and can therefore be added at any convenient point.

Additive 12, however, is an additive such as a surfactant which tends to gel, or have properties similar to those illustrated in FIG. 2, if mixed with water below certain temperatures, for example at ambient temperature. Stream 16 is therefore fed to a heater 18 to increase the temperature of stream 16 from ambient temperature to a temperature $T_C$ which is greater than ambient temperature, and which is preferably less than the maximum gelling temperature $T_G$ of additive 12. The heated stream 20 is then fed to a static mixer 22, through a static mixer inlet 24, to impart mixing energy to the stream. Once at least some energy has been imparted to the stream, additive 12 is then added to static mixer 22, preferably at an additive inlet 26 which is schematically illustrated in FIG. 1.

The mixing energy imparted to stream 20 within mixer 22 in accordance with the invention has advantageously been found to be sufficient to prevent gel formation of additive 12, despite the fact that the temperature of stream 20 has not been heated to a temperature above the gelling temperature $T_G$.

Stream 28 exiting static mixer 22 advantageously comprises a substantially homogeneous and gel-free mixture of water 16 and additive 12, along with any other additives 10 and the like which may have been provided as desired.

As set forth above, additives 10 and 14 are water soluble, and can be added at any point. Thus, in the embodiment illustrated in FIG. 1, additive 10 is added to stream 16 upstream of heater 18 and static mixer 22, while additive 14 is added downstream of mixer 22.

Still referring to FIG. 1, stream 28 can itself be fed, at temperature $T_C$, to further processing steps such as an emulsion forming step or the like, particularly when such process is effective at temperature $T_C$. This is advantageous since the heat used to form the solution can be used again in such emulsion preparation, thereby enhancing process efficiency.

For other processes, wherein lower temperatures are required, stream 28 can be fed to a cooler 30 as schematically illustrated so as to reduce the temperature to a temperature $T_P$ which is more suitable to the desired process.

Figure 2:
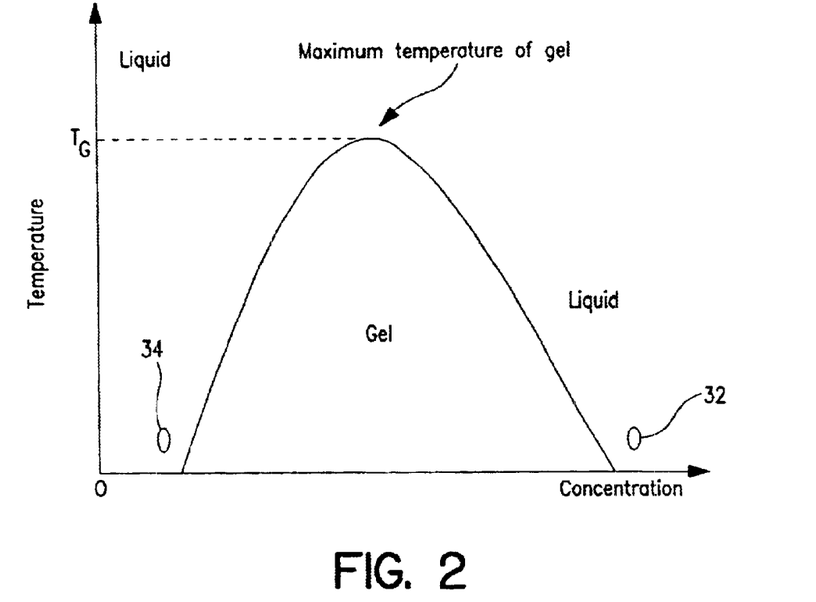
FIG. 2 illustrates the gel temperature profile for a typical surfactant material at different concentrations in water.
Figure 3:
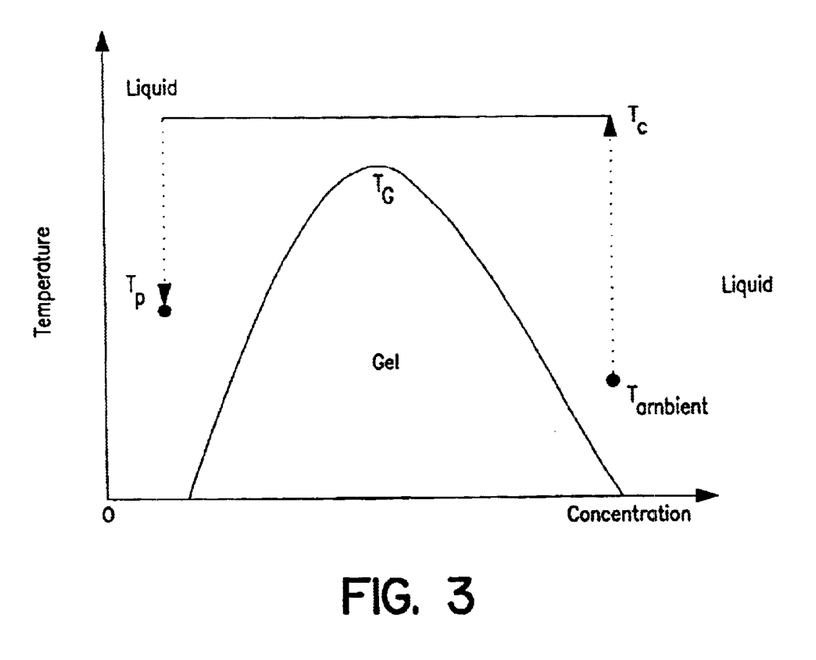
FIG. 3 illustrates a heat-only process that can be used to avoid gelling.
Figure 4:
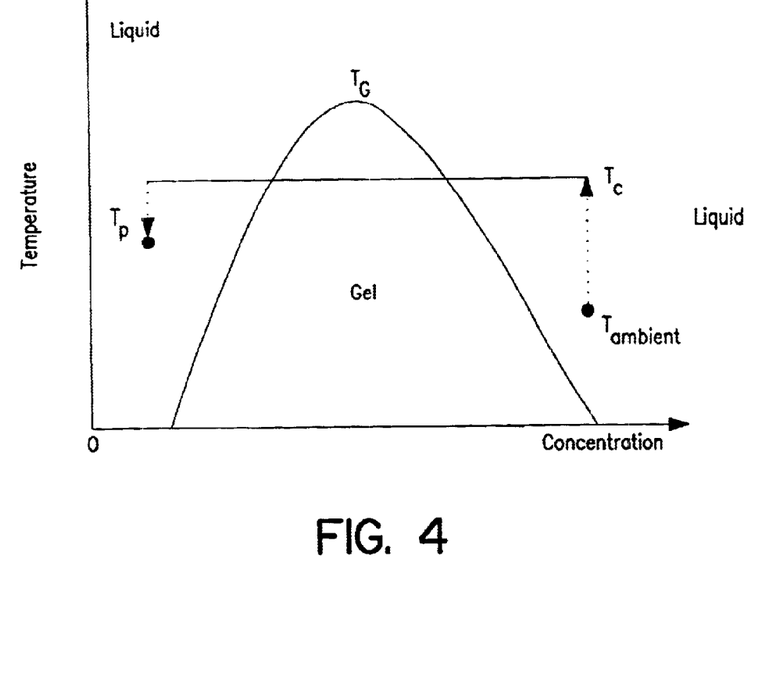
FIG. 4 illustrates a preferred embodiment of the present invention wherein some heat is applied, and mixing energy is used to avoid gel formation.

Referring to FIGS. 2–4, FIG. 2 shows a typical gel temperature profile for a liquid additive having gelling tendencies, and shows the gelling temperature $T_G$ at concentrations of the additive in water. As shown, at high concentrations the additive is liquid at substantially any temperature. As should also be clear, however, if such material is merely added to water, so as to reduce concentration at a low temperature, the additive will gel and cause various problems.

One class of additives which has a gelling profile as illustrated in FIG. 2 are surfactants for use in making oil/water emulsions. For example, ethoxylated nonylphenol (NPE) has a profile as illustrated. NPE is typically provided commercially having a concentration in water of about 90% or higher, which generally corresponds to point 32 shown in FIG. 2. Another example of such a surfactant is ethoxylated alcohol (TDE). It is typical to use such surfactants at a reduced concentration, preferably of about 0.2%, which corresponds to point 34 shown on FIG. 2. In accordance with the present invention, the process provided allows for dilution from point 32 to point 34 without the need to heat in excess of temperature $T_G$, and without the formation of gel.

Of course, NPE is one example only of an additive having a gelling profile as illustrated in FIG. 2. Other additives behave similarly and can therefore advantageously be used in accordance with the process of the present invention. Furthermore, the various additives which can be used in accordance with the present invention advantageously include at least one surfactant selected from the group consisting of nonionic surfactants, anionic surfactants, inactive surfactants, bioactive surfactants, activating additives for activating inactive surfactants, polymers, clay particles and the like, and combinations thereof. In connection with activating additives for activating inactive surfactants, the inactive surfactants can be naturally occurring or separately added, or a combination of both. The activating additive can advantageously comprise a pH buffer solution selected so as to provide the resulting water solution of the additive with a pH of at least about 10. Furthermore, a preferred activating additive is an alkaline additive selected from the group consisting of sodium, potassium and lithium salts, amines and combinations thereof.

FIG. 3 illustrates the heating and cooling that would be necessary to go from ambient temperature to a processing temperature while heating to a temperature above $T_G$. While this would avoid formation of gel, it should readily be appreciated that the heating and cooling costs would be substantial.

Turning now to FIG. 4, the preferred process of the present invention is shown wherein the additive is diluted with water at a temperature that is heated to a temperature $T_C$ that is greater than ambient temperature, but less than the maximum gel formation temperature $T_G$. This moves the additive sufficiently high on the gel formation profile that energy imparted from the static mixer can successfully prevent formation of gel and allow effective mixture with the liquid base or water as desired.

It should readily be appreciated that the heating and cooling costs in the process of the present invention are substantially reduced as compared to that in FIG. 3. Further, a static mixer which is used to provide the energy desired is likewise efficiently operated, reliable and inexpensive.

Figure 5:
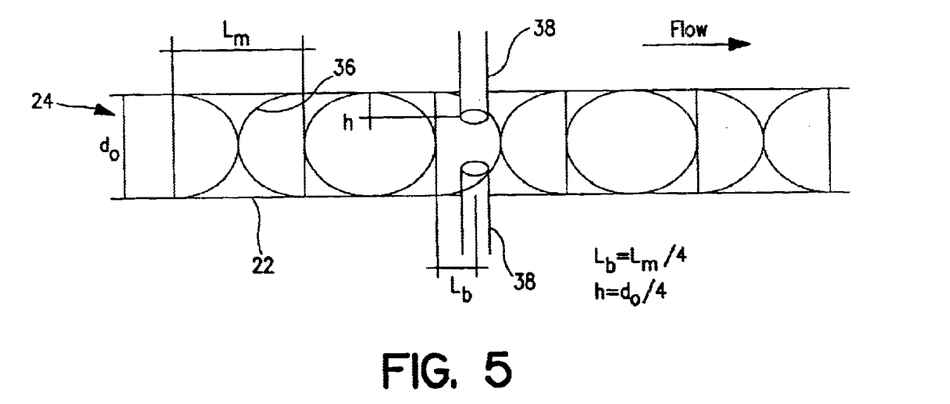
FIG. 5 schematically illustrates the optional dimensions of mixer elements in accordance with the present invention, along with preferred placement of an additive injector.

Turning now to FIG. 5, a preferred placement of additive inlet is illustrated. FIG. 5 schematically shows a static mixer wherein mixer 22 has a series of swirling flow imparting members 36 each having a length $L_m$ corresponding to a 360° rotation along mixer 22. Mixer 22 and member 36 also have a diameter $d_o$. In accordance with the present invention, a surfactant or additive inlet 38, or preferably a plurality of inlets 38, are advantageously positioned downstream of the beginning of a swirling flow imparting member 36 by a distance $L_b$ which is preferably approximately equal to $L_m/4$. Furthermore, inlet or inlets 38 advantageously extend inwardly into mixer 22 by a distance h which is preferably equal to about $d_o/4$. This advantageously injects the additive into the stream at a point where sufficient swirling energy has been imparted that gel formation can be avoided at temperatures less than the gel formation temperature. This advantageously provides for the excellent results obtained in accordance with the present invention.

It should readily be appreciated that the surfactant solution preparation process provided can be carried out in a continuous manner, and provides for manufacture of downstream products such as viscous hydrocarbon in water emulsions with a high degree of quality since surfactant concentration is homogeneously distributed through the water phase. Furthermore, it should readily be appreciated that this process provides such excellent results with a minimum amount of energy used for heating and/or cooling, and utilizing a mixer which requires a minimum amount of maintenance.

Figure 6:
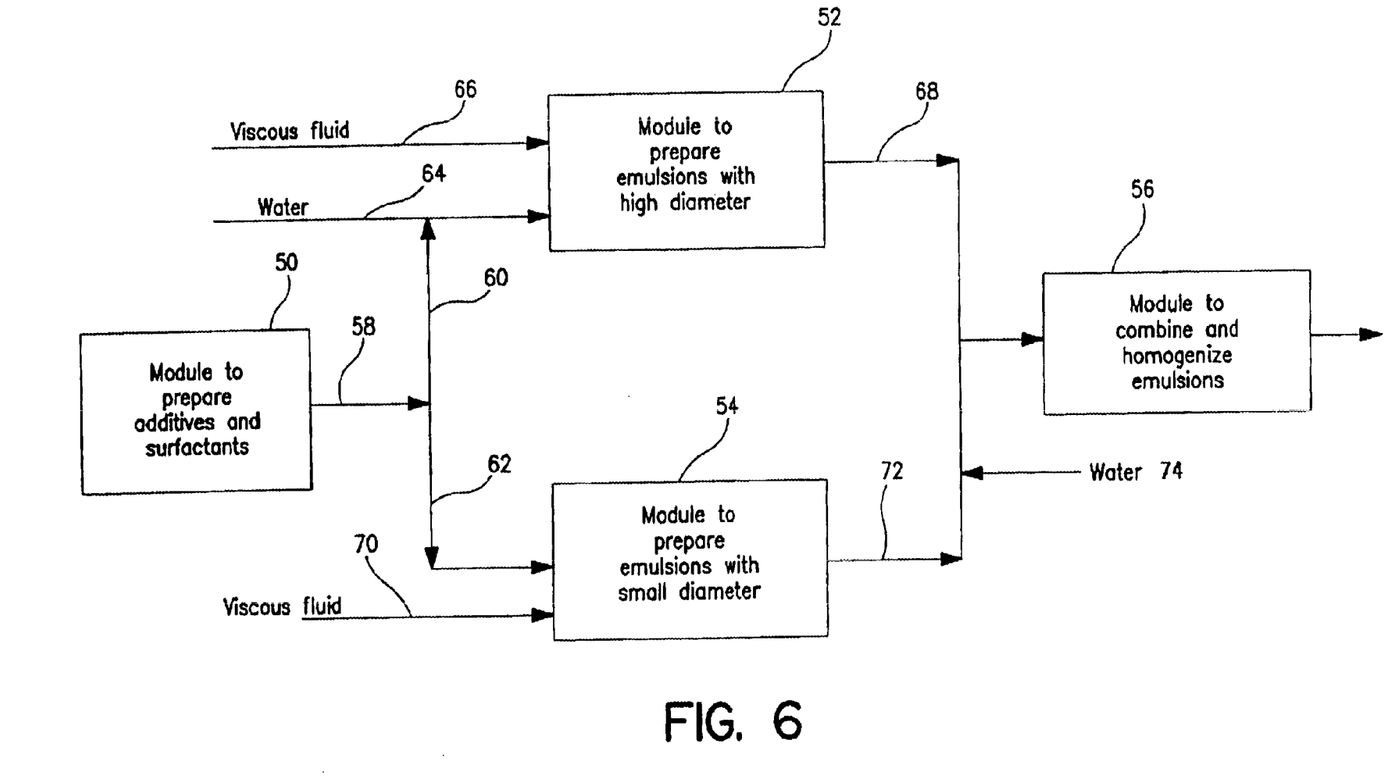
FIG. 6 schematically illustrates a process in accordance with the present invention.

FIG. 6 schematically illustrates a process in accordance with the present invention for preparing an emulsion in accordance with the present invention. FIG. 6 shows module 50 for preparing an additive and surfactant solution as described above in connection with FIGS. 1–5.

As shown in FIG. 6, modules 52, 54 are also provided for preparation of two or more different emulsions, and a module 56 is provided for combining the different emulsions to produce the desired final emulsion.

Still referring to FIG. 6, in accordance with the present invention, a solution stream 58 from module 50 is advantageously divided into a first portion 60 and a second portion 62. First portion 60 may be further diluted with water 64 if desired, and then mixed with a hydrocarbon 66 in a mixer in module 52 so as to form a first emulsion 68 having a large droplet diameter size, for example in the range of about 30 microns.

Second portion 62 is mixed with hydrocarbon 70 in a mixer of module 54 so as to form a second emulsion 72 which has a small average droplet size. Emulsions 68 and 72 are then combined in module 56 to form the desired end emulsion. In this regard, additional water 74 may advantageously be added to the system, for example by adding to small droplet diameter emulsion 72, so as to provide a final bimodal emulsion having a desired water content, for example of greater than or equal to about 29%, and/or further water can be added downstream of the emulsion mixing process as well.

Figure 7:
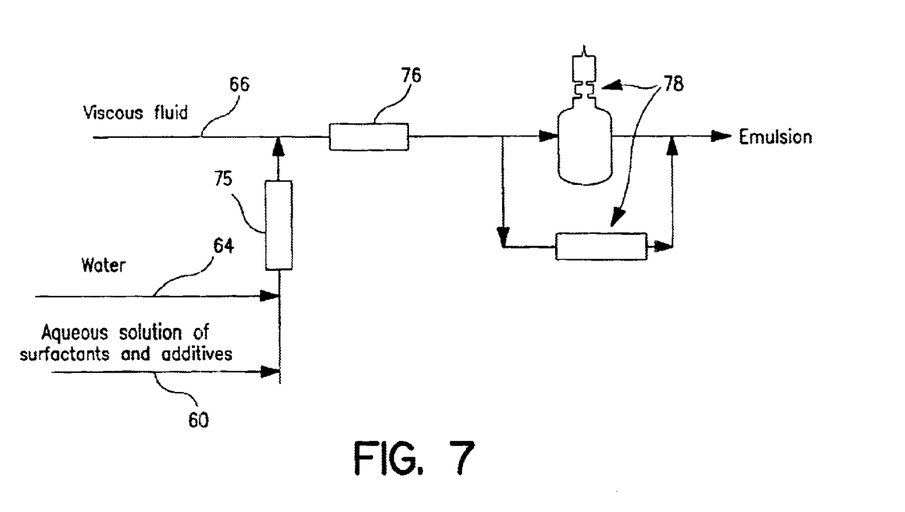
FIG. 7 schematically illustrates a portion of the process of FIG. 6.

FIG. 7 schematically illustrates the portion of FIG. 6 relating to module 52 for forming the large droplet diameter emulsion according to the embodiment of FIG. 6. FIG. 7 shows portion 60 of the surfactant and additive solution being mixed with water 64 and fed to a first mixer 75 which in this case is shown as a static mixer. The resulting mixture is then combined with hydrocarbon 66 and fed to a further mixer 76 which in this case is also shown as being a static mixer. It should be appreciated that mixers 75, 76 as shown herein can alternatively be dynamic mixers if preferred. From static mixer 76, the hydrocarbon-water mixture is then further fed to a further mixer 78 which may be a dynamic mixer or a static mixer, or both, and which is preferably operated at a shear sufficient to provide the desired droplet size emulsion. In this regard, shear with a dynamic mixer is controlled by operating the mixer at particular rates, while shear in a static mixer is controlled by adjusting the flow rate and temperature for a given mixer diameter.

Figure 8:
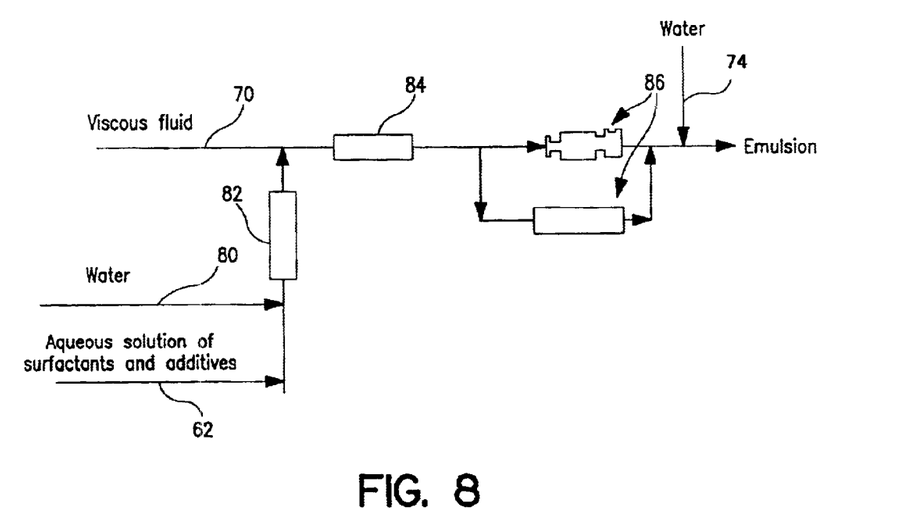
FIG. 8 schematically illustrates a further portion of the process of FIG. 6.

FIG. 8 is substantially similar to FIG. 7 and shows in greater detail module 54 for preparation of the small droplet diameter emulsion of the embodiment of FIG. 6. As shown, a second portion 62 of surfactant additive solution is mixed with additional water 80 and fed to a mixer 82 which is also shown in this case as a static mixer. The resulting diluted solution is then mixed with hydrocarbon 70 and fed to a further mixer 84 which may also be a static or dynamic mixer, and which is shown in this case as a static mixer. The resulting pre-mixed combination is then fed to a further mixer 86 which can be either a dynamic mixer, a static mixer or both, and which is operated at shear selected to provide the desired small droplet size, for example of 3 microns. The resulting emulsion may be diluted with further water 88 as shown, and is then fed to module 56 (FIG. 6) for final preparation of the desired emulsion.

As set forth above, the formed emulsion can advantageously be diluted so as to provide a desired ratio of hydrocarbon to water in the final product. In this regard, the additional mixing step is preferably carried out so as to provide an emulsion having a ratio by volume of hydrocarbon to water of at least about 90:10, and emulsion dilution advantageously is carried out so as to provide a final emulsion having a ratio by volume of hydrocarbon to water of less than about 90:10. More preferably, the initial emulsion is formed having a ratio of hydrocarbon to water, by volume, of at least about 97:3, and the step of adding water to dilute the emulsion is carried out so as to provide a final emulsion having a ratio of hydrocarbon to water, by volume, of about 70:30. Of course, other ratios may be desired. However, the ratios as set forth above advantageously provide for efficient and effective mixing of emulsions and a particularly stable and desirable final product.

Figure 9:
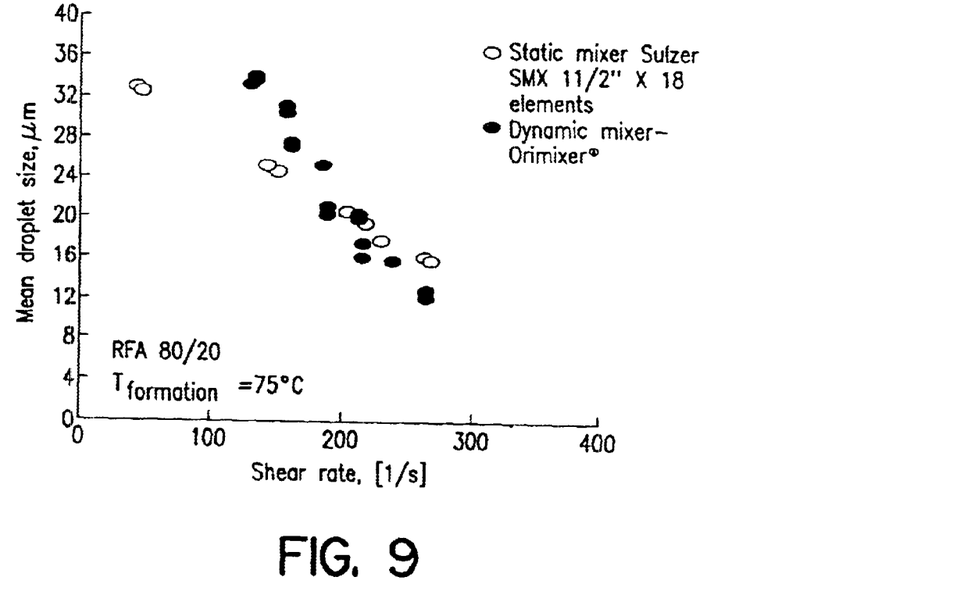
FIG. 9 illustrates droplet size distribution obtained using static and dynamic mixers for large droplet size emulsions.
Figure 10:
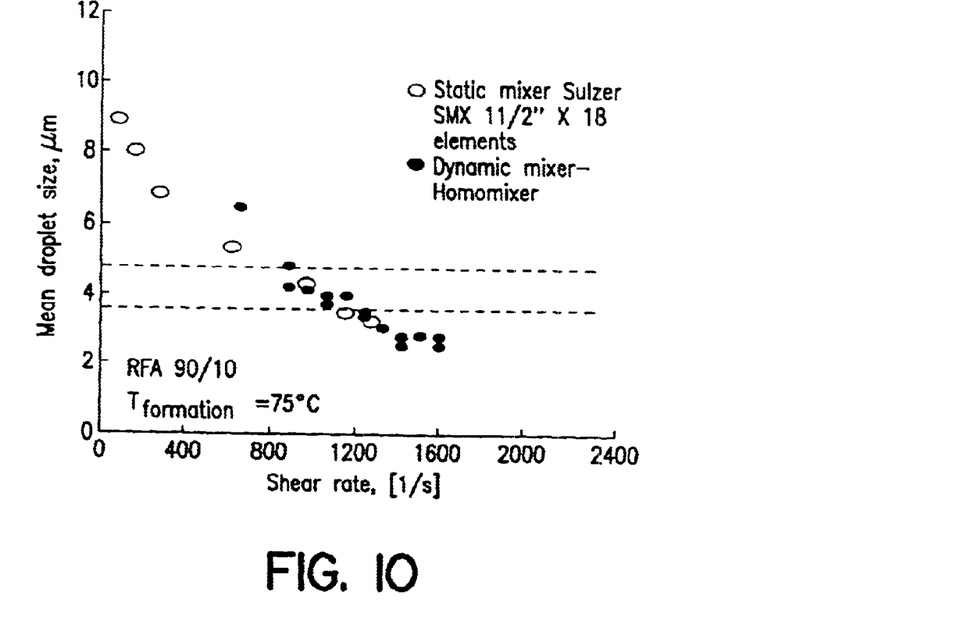
FIG. 10 illustrates droplet size distribution obtained using static and dynamic mixers for small droplet size emulsions.

FIGS. 9 and 10 show shear rates used with static and dynamic mixers in order to obtain large and small droplet sizes, respectively, for emulsions as desired. FIG. 9 shows that, in order to obtain droplet sizes in the range of 12–35 microns, static and dynamic mixers both provide acceptable results at shear rates of less than 300 1/s, and these mixers appear to be interchangeable as compared to results obtained.

FIG. 10 shows that, for the small droplet size emulsion, acceptable mean droplet sizes in the range of 3.5 to 4.75 microns can be obtained with static or dynamic mixers at shear rates between about 800 and about 1200 1/s, and also shows that static and dynamic mixers are substantially interchangeable for providing such droplet sizes.

The foregoing description is given in terms of preparation of a final emulsion from two or more different emulsions. It should of course be appreciated that the process of the present invention, including additive solution preparation and operation of mixers, is equally well suited to preparation of a single emulsion as well. In this case, and referring to FIG. 6, module 54 would not be needed. Further, module 56 for combining would not be necessary, and only a dilution module for diluting the final emulsion to the desired water content would be desired.

As set forth above, the hydrocarbon phase from which the emulsions can be prepared in accordance with the process of the present invention is any of a wide variety of hydrocarbons. This process can most advantageously be used with viscous hydrocarbons since the emulsion provides beneficial reduction of viscosity.

Additives to be added in the solution in module 50 may typically include nonionic surfactants, anionic surfactants, bioactive surfactants, inactive surfactants, activating additives for activating inactive surfactants, polymers, clay particles and the like, and combinations thereof. The process of the present invention advantageously allows for such additives and surfactants, including those which gel upon contact with water, to be used in the desired small concentrations, through dilution with water, without adverse gelling and the like. This is particularly advantageous in that a savings in material costs is experienced when the small concentrations of surfactant are used. Furthermore the use of excessive surfactant, in addition to being a cost, can be undesirable in the final product as well.

Figure 11:
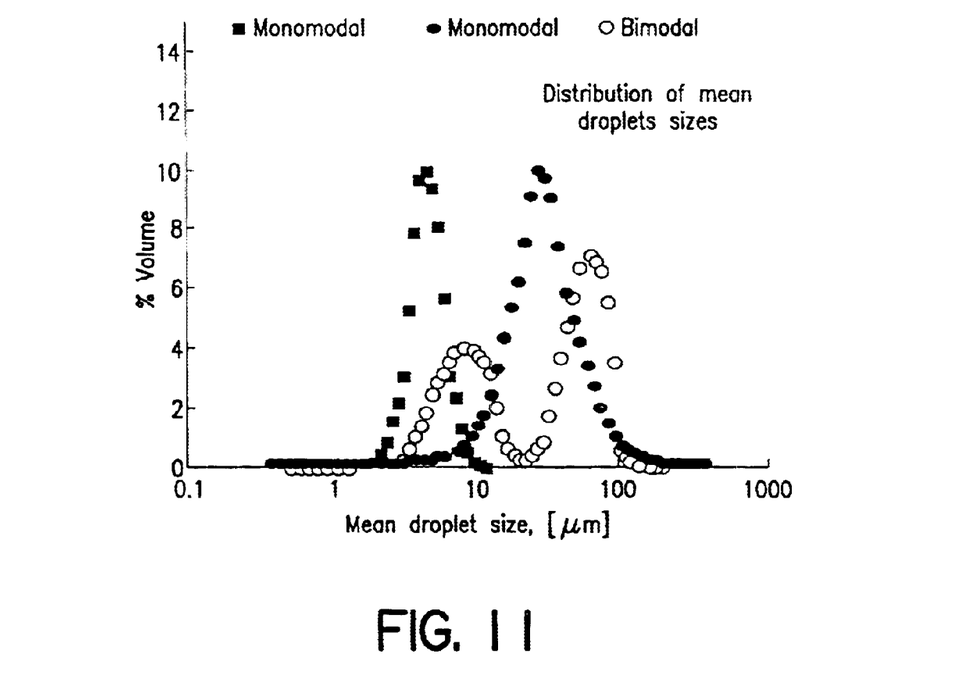
FIG. 11 illustrates droplet size distribution obtained by mixing large and small droplet size emulsions in optimal proportions.

Turning now to FIG. 11, bimodal emulsions can advantageously be formed by first making a plurality of monomodal emulsions, and then mixing the emulsions in accordance with the process described above. FIG. 11 shows two different monomodal emulsions in terms of droplet size distributions, and also shows the droplet size distribution for a bimodal or final emulsion product prepared from the two monomodal emulsions. This final product is stable and has desired properties.

Figure 12:
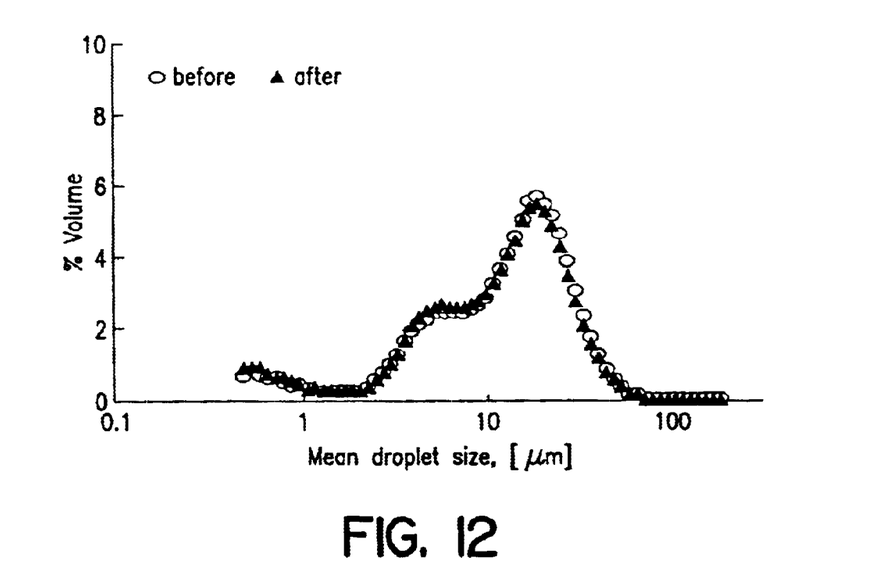
FIG. 12 illustrates droplet size distribution obtained after incorporation of additives and water in order to fine tune the resulting emulsion properties.

In further accordance with the invention, it has been found that emulsions prepared in accordance with the present invention are particularly stable when mixed with additional additives. In order to prepare a final emulsion product, various additives are typically required, many of which can adversely impact upon stability of the emulsion. Emulsions prepared in accordance with the present invention, however, show remarkable stability even after such additives have been mixed into the emulsion product. FIG. 12 shows mean droplet size for an emulsion before and after mixing with additional additives. As can be seen, the droplet size distribution is substantially identical before and after addition of these additives. This stability allows for fine-tuning of the emulsion product to desired properties which is a particular advantage of the process of the present invention.

The following examples demonstrate the excellent results obtained using the surfactant solution preparation process in accordance with the present invention.

EXAMPLE 1

In this example, a Kenics™ mixer having ¾ inch X12 elements was used to mix TDE with water at a temperature of 35° C. This water had been heated to 35° C. from ambient temperature. Mixing was carried out at various water flow rates and additive flow rates, with mixing energy imparted by the static mixer being determined based upon the materials fed to the mixer, the process temperature and specifics of the mixer. Table 1 below sets forth the amounts of dissolution obtained in each case.

TABLE 1

| Water Flow (l/s) | Additive Flow (ml/min.) | Mixing Energy (W/Kg) | Dissolution Degree (grs dissolved/total grs) |
|---|---|---|---|
| 0.42 | 303 | 199 | 0.99 |
| 0.33 | 240 | 104 | 0.98 |
| 0.24 | 180 | 40 | 0.94 |
| 0.12 | 84 | 4 | 0.78 |

As shown, excellent dissolution was obtained at mixing energy of 40 W/Kg and above for the flows shown. At a mixing energy of only 4 W/Kg only 78% dissolution was obtained. Thus, the mixing energy provided by the static mixer in accordance with the present invention clearly helps to avoid gel formation and enhances complete dissolution of the additive.

EXAMPLE 2

In this example, a stream of heated water was mixed with surfactant in three different locations along the mixer in order to demonstrate the advantageous position of injectors for the additive.

In the first instance, the additive was injected at the entrance to the mixer, along with the water. In the second evaluation, the additive was injected through a single injector at a point as selected according to the illustration of FIG. 5. Finally, in a third evaluation, additive was injected through two injectors positioned at a point as illustrated in FIG. 5.

With the additive introduced at the entrance to the mixer, only 72% dissolution was obtained. With additive introduced through a single injector downstream of the inlet, 80% dissolution was obtained. With the additive injected through two injectors downstream of the inlet as illustrated in FIG. 5, 94% dissolution was obtained. Thus, positioning of the injector or inlet for the additive in accordance with the present invention provides for enhanced dissolution as desired.

It should readily be appreciated that a process has been provided in accordance with the present invention for preparing hydrocarbon-in-water emulsions, wherein liquid additives are prepared for incorporation into the emulsion without gelling, and wherein a final emulsion can be prepared to meet specific requirements, all as desired.

Gelling of additives is avoided without use of excessive amounts of mixing energy, thereby allowing small concentrations of additives such as surfactants and the like to be used without gelling. Further, the process provides a versatility in adapting emulsions to desired end uses, including a potentially wide variety of additives, without affecting emulsion stability and without gelling of the additives.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for preparing a hydrocarbon in water emulsion, comprising the steps of:
    providing a liquid additive that tends to gel when mixed with water at temperatures less than a maximum gelling temperature $T_G$ of said liquid additive;
    providing a stream of water at temperature $T_C$ less than said maximum gelling temperature $T_G$;
    feeding said stream to a static mixer having a mixer inlet so as to impart energy to said stream;
    adding said liquid additive to said static mixer downstream of said mixer inlet, whereby said liquid additive mixes with said stream and said energy is at an effective amount to inhibit inhibits gelling of said liquid additive at $T_C$ and so as to provide a substantially homogeneous solution of said liquid additive in said water; and
    mixing said solution with a hydrocarbon in a mixer so as to form a hydrocarbon-in-water emulsion.

2. The process of claim 1, wherein said stream is provided at ambient temperature, and further comprising the step of heating said stream to said temperature $T_C$.

3. The process of claim 1, wherein said liquid additive comprises at least one component selected from the group consisting of nonionic surfactants, anionic surfactants, bioactive surfactants, inactive surfactants, activating additives for activating inactive surfactants, polymers, clay particles and combinations thereof.

4. The process of claim 3, wherein said liquid additive is selected from the group consisting of ethoxylated nonylphenol, ethoxylated alcohol and combinations thereof.

5. The process of claim 3, wherein said activating additive comprises a pH buffer solution selected so as to provide said water solution with a pH of at least about 10.

6. The process of claim 3, wherein said activating additive is an alkaline additive selected from the group consisting of sodium, potassium and lithium salts, amines and combinations thereof.

7. The process of claim 1, wherein said hydrocarbon is selected from the group consisting of crude oil, viscous hydrocarbon, refinery resid, bitumen, coke and mixtures thereof.

8. The process of claim 1, wherein said mixing step is carried out so as to provide an emulsion having a ratio by volume of hydrocarbon to water of at least about 90:10, and further comprising the step of adding water to said emulsion so as to provide a final emulsion having a ratio by volume of hydrocarbon to water of less than about 90:10.

9. The process of claim 8, wherein said emulsion has a ratio by volume of hydrocarbon to water of at least about 97:3.

10. The process of claim 8, wherein said final emulsion has a ratio by volume of hydrocarbon to water of about 70:30.

11. The process claim 1, wherein said mixing step comprises dividing said stream into a first portion and a second portion; mixing said first portion with a first hydrocarbon in a first mixer at shear sufficient to form a first hydrocarbon-in-water emulsion having a first average droplet size; mixing said second portion with a second hydrocarbon in a second mixer at shear sufficient form a second hydrocarbon-in-water emulsion having a second average droplet size; and combining said first emulsion and said second emulsion so as to provide a combined emulsion having at least two distinct droplet size populations.

12. The process of claim 1, wherein said mixer is selected from the group consisting of static mixers, dynamic mixers and combinations thereof.

13. The process of claim 1, wherein said mixer is a static mixer.

14. The process of claim 1, further comprising the step of mixing said hydrocarbon-in-water emulsion with additional additive solutions so as to adjust one or more properties of said hydrocarbon-in-water emulsion.

* * * * *